United States Patent
Hayashi

(10) Patent No.: US 11,015,231 B2
(45) Date of Patent: May 25, 2021

(54) METHOD OF MANUFACTURING FUEL RAIL FOR GASOLINE DIRECT INJECTION

(71) Applicant: USUI CO., LTD., Shizuoka (JP)

(72) Inventor: Koichi Hayashi, Shizuoka (JP)

(73) Assignee: USUI CO., LTD., Shizuoka (JP)

( * ) Notice: Subject to any disclaimer, the term of this patent is extended or adjusted under 35 U.S.C. 154(b) by 49 days.

(21) Appl. No.: 16/699,113

(22) Filed: Nov. 29, 2019

(65) Prior Publication Data

US 2020/0095647 A1    Mar. 26, 2020

Related U.S. Application Data

(62) Division of application No. 15/542,077, filed as application No. PCT/JP2015/006215 on Dec. 14, 2015, now abandoned.

(30) Foreign Application Priority Data

Jan. 22, 2015    (JP) .................. 2015-009969

(51) Int. Cl.

| B23K 1/00 | (2006.01) |
|---|---|
| C21D 9/08 | (2006.01) |
| C22C 38/12 | (2006.01) |
| F02M 55/04 | (2006.01) |
| C22C 38/00 | (2006.01) |
| C22C 38/02 | (2006.01) |
| C22C 38/04 | (2006.01) |
| C22C 38/44 | (2006.01) |
| F02M 55/02 | (2006.01) |
| B23K 103/04 | (2006.01) |
| B23K 101/04 | (2006.01) |

(52) U.S. Cl.
CPC .............. *C21D 9/08* (2013.01); *B23K 1/0008* (2013.01); *C22C 38/002* (2013.01); *C22C 38/02* (2013.01); *C22C 38/04* (2013.01); *C22C 38/12* (2013.01); *C22C 38/44* (2013.01); *F02M 55/025* (2013.01); *F02M 55/04* (2013.01); *B23K 2101/04* (2018.08); *B23K 2103/04* (2018.08); *C21D 2211/002* (2013.01); *F02M 2200/9053* (2013.01)

(58) Field of Classification Search
CPC ..... C21D 9/08; C21D 2211/002; C22C 38/12; C22C 38/002; C22C 38/02; C22C 38/04; C22C 38/44; C22C 38/48; C22C 38/00; C22C 38/26; F02M 55/04; F02M 55/025; F02M 2200/9053; F02M 55/02; B23K 1/0008; B23K 2103/02–06; B23K 2101/04–125
See application file for complete search history.

(56) References Cited

U.S. PATENT DOCUMENTS

| 2,158,383 A | * | 5/1939 | Saunders ............... B21D 53/04 |
|---|---|---|---|
| | | | 29/890.039 |
| 2,211,448 A | * | 8/1940 | Vaughn ................ F23D 14/465 |
| | | | 228/220 |
| 2,309,099 A | * | 1/1943 | Crampton ............. F16L 41/021 |
| | | | 285/133.4 |
| 2,356,583 A | * | 8/1944 | Hampton ............... B23K 3/025 |
| | | | 205/149 |
| 2,731,245 A | * | 1/1956 | McChesney ............. F28F 1/12 |
| | | | 165/180 |
| 2,862,136 A | * | 11/1958 | Miller ..................... H01J 21/36 |
| | | | 313/261 |
| 3,200,610 A | * | 8/1965 | Steenburgh, Jr. ......... F25C 1/12 |
| | | | 62/298 |
| 2005/0108962 A1 | * | 5/2005 | Lievin ...................... H01P 1/08 |
| | | | 52/204.5 |
| 2011/0209803 A1 | | 9/2011 | Sugimoto et al. |

FOREIGN PATENT DOCUMENTS

| EP | 1914418 A | 4/2008 |
|---|---|---|
| EP | 2050833 A | 4/2009 |
| JP | 2005-226623 A | 8/2005 |
| JP | 2007-016668 A | 1/2007 |
| JP | 2007-231353 A | 9/2007 |
| JP | 2007-291416 A | 11/2007 |
| JP | 2008-163409 A | 7/2008 |
| JP | 2008-297588 A | 12/2008 |
| JP | 2010-007651 A | 1/2010 |
| JP | 2010-106353 A | 5/2010 |
| JP | 2012-126974 A | 7/2012 |

OTHER PUBLICATIONS

International Search Report for PCT/JP2015/006215 dated Jan. 26, 2016.

\* cited by examiner

*Primary Examiner* — Kiley S Stoner
(74) *Attorney, Agent, or Firm* — Yokoi & Co, U.S.A.; Toshiyuki Yokoi

(57) ABSTRACT

To obtain, at low cost, a fuel rail that maintains low hardness and good formability before being formed into a tube stock, can be made to form a welded pipe, and has high-strength properties with which the fuel rail can withstand a high fuel pressure even when formed so as to be relatively thin. A fuel rail for gasoline direct injection that is used at a fuel pressure of at least 30 MPa and is formed from an iron-alloy welded pipe. The fuel rail comprises an iron alloy that contains chemical components of C, Si, Mn, P, S, Nb, and Mo. The plate thickness t and the outer diameter D of the fuel rail have a ratio t/D of 0.2 or less. A bainitic structure can be precipitated by brazing the fuel rail in a furnace during manufacturing.

1 Claim, No Drawings

METHOD OF MANUFACTURING FUEL RAIL FOR GASOLINE DIRECT INJECTION

TECHNICAL FIELD

The invention relates to a fuel rail for gasoline direct injection.

BACKGROUND ART

The fuel pressure of a conventional gasoline direct injection system is 20 MPa or less and pressure-resistance strength is ensured by keeping a specified thickness of the fuel rail. It is unnecessary to use especially high-strength material in such a region of fuel pressure and as the fuel rail is comparatively thin-walled, it is possible to produce a welded tube. However, in recent years, fuel pressure of gasoline direct injection system has been further increased as indicated in patent documents 1 and 2, and at present exceeds 30 MPa in order to improve fuel efficiency and due to more stringent emission regulations. For that reason, it is necessary for the fuel rail to be formed thick to withstand such high pressure.

PRIOR ART DOCUMENTS

Patent Documents

Patent document1: JP200716668
Patent document2: JP2010007651

DISCLOSURE OF THE INVENTION

Problems to be Solved by the Invention

However, because it is difficult to fabricate a welded tube with roll-forming which has sufficient tube thickness to withstand the fuel pressure of 30 MPa or more, there is no other option than to manufacture a seamless pipe but its manufacturing is of high cost. Also, as a method other than thickening, it is conceivable to form a thin material by strengthening the material itself, but since the high-strength material used in the past has a large carbon content, it is difficult to satisfy the high strength property which is the original objective because the surface is decarburized due to high temperature during brazing in the furnace and the fatigue strength decreases. Further, such a material is unsuitable for welding and it is impossible to sufficiently ensure the quality of welding.

This invention aims at solving the problem mentioned above, and therefore, at obtaining, at low cost, a fuel rail that maintains low hardness and good formability before being formed into a tube stock, so that it can be made to form a welded pipe by roll forming, and has high-strength properties with which the fuel rail can withstand a high fuel pressure even when formed into a relatively thin thickness.

Means for Solving the Problem

It is therefore an object of the present invention to solve the problems as described above and it is an object of the present invention to provide a fuel rail for gasoline direct injection at a fuel pressure of 30 MPa or more which is formed from an iron-alloy welded pipe wherein the fuel rail comprises an iron alloy that contains chemical components of C, Si, Mn, P, S, Nb, and Mo, wherein the plate thickness t and the outer diameter D of the fuel rail have a ratio of t/D of 0.2 or less, and wherein a bainitic structure can be precipitated by brazing it in a furnace during manufacturing. Note that, in-furnace brazing processing of the invention means a process of rising the temperature to 1000° C. or more in a furnace and then cooling down gradually from that temperature to room temperature.

The fuel pressure may be 30 MPa 80 MPa.

Effects of the Invention

The invention comprises an iron alloy that includes chemical components of C, Si, Mn, P, S, Nb, and Mo as mentioned above and forms ferrite structure or ferrite-pearlite structure before being formed into a tube stock. For that reason, low hardness can be maintained in this state and the quality of welding can be satisfactorily held so that it is possible to easily process a fuel rail.

In addition, a bainitic structure is precipitated by performing an in-furnace brazing processing in the manufacturing process. As a result, the material composed of this bainitic structure has high strength to ensure high pressure resistance compared to conventional materials. The entire shape can be formed to have a thin wall and to be light-weighted and the welded pipe can be formed by roll-forming at low cost, and thus the invention provides a product allowed to be used at a fuel pressure of 30 MPa or more due to characteristics such as high strength and high pressure resistance.

MODES FOR CARRYING OUT THE INVENTION

A fuel rail for gasoline direct injection of the Examples of this invention is described below. First, among the iron alloy materials constituting this example, the chemical components excluding iron and impurities and the compounding ratio to all the components are shown in Table 1 below.

TABLE 1

| | C(%) | Si(%) | Mn(%) | P(%) | S(%) | Nb(%) | Mo(%) | Ni(%) | Cr(%) |
|---|---|---|---|---|---|---|---|---|---|
| Example 1 | 0.20 | 0.21 | 1.63 | 0.010 | 0.002 | 0.026 | 0.38 | — | — |
| Example 2 | 0.18 | 0.20 | 1.25 | 0.015 | 0.002 | 0.025 | 0.25 | — | — |
| Comparative Example 1 | 0.02 | 0.33 | 1.33 | 0.036 | 0.022 | — | — | 9.89 | 18.35 |

Examples 1 and 2 of the invention include C, Si, Mn, P, S, Nb, and Mo, as shown above. The production method of Examples 1 and 2 is as follows. Examples 1 and 2 are iron alloys comprising the chemical components shown in Table 1 above, in addition to iron and the other impurities. This material was then formed into a welded pipe with its both ends closed by parts, and sockets and fixtures were installed in the pipe, respectively. Next, the completed assembly is subjected to copper-brazing in a furnace at temperature of 1000° C. or more, annealed, and then, shipped as a product after passing through the process of die matching, leak checking, or the like.

The fuel rails of Examples 1 and 2 were copper-brazed in a furnace as mentioned above, and during this copper brazing process, the temperature in a furnace raised to 1000° C. or more, and after that, cooled down slowly. Physical properties of the iron alloy of Examples 1 and 2 made of the materials as described above change due to the copper-brazing in the furnace. In order to examine changes in physical properties before and after the copper-brazing in the furnace, physical property testing was conducted based on the JIS standard.

Specifically, JIS5 test pieces (test piece thickness 1.6 mm, formed width 25 mm, and formed length 350 mm) of the materials of Examples 1 and 2 were formed at first and then tensile testing and structure observation were conducted by using these test pieces. The results of the tensile testing and structure observations are shown in Table 2 below. Note that, "Before" and "After" mean the state before the tube stock being formed, and the state after the tube stock being copper-brazed in a furnace, respectively.

TABLE 2

| Examples | Tensile Strength (MPa) | | 0.2 Prof Stress (MPa) | | Extension Coefficient (%) | | Hardness (HV) | | Structure | |
|---|---|---|---|---|---|---|---|---|---|---|
|  | Before | After | Before | After | Before | After | Before | After | Before | After |
| 1 | 675 | 722 | 434 | 499 | 23.2 | 23.4 | 225 | 238 | Ferrite Ferrite-Pearlit | Bainite |
| 2 | 568 | 628 | 361 | 434 | 26.6 | 16.0 | 190 | 211 | Ferrite Ferrite-Pearlit | Bainite |

As shown in Table 2, the values of tensile strength, 0.2% proof stress, and hardness after the copper-brazing in the furnace were larger than those values before being formed into the tube stock. Precipitation of bainite occurred in both Example 1 and Example 2 after copper-brazing in a furnace, according to structure observation of the tube. By contrast, the structure before being formed into a tube stock was either Ferrite or Ferrite-Pearlite only, and no bainite structure was found.

It was confirmed from this result that the fuel rail of Examples 1 and 2 containing chemical components of C, Si, Mn, P, S, Nb, and Mo formed a bainite structure due to the process of copper-brazing in the furnace, and high strength and high hardness properties could be obtained compared with the state before being formed into a tube stock. Further, it was confirmed that as the state before being formed into a tube stock had the same ferrite or ferrite-pearlite structure as the conventional one have, and the quality of welding can be satisfactorily maintained and the material was superior in good formability.

In addition, tensile testing and structure observation were conducted based on the JIS standard, about the materials used in Example 1 and 2, and the materials used in conventional fuel rails, for confirming the difference in the materials' physical properties between those of Examples 1 and 2 and the conventional fuel rail containing different chemical components compared to Examples 1 and 2. Among the iron alloy materials constituting Comparative Example 1, the chemical components excluding iron and impurities and the compounding ratio to all the components are shown in Table 1 below. As shown in Table 1, Comparative Example 1 does not include Nb and Mo, and its chemical components are different from that of Examples 1 and 2, and also include Ni and Cr which are not included in the materials of Examples 1 and 2. Note that, JIS5 test pieces (test piece thickness 1.6 mm, formed width 25 mm, and formed length 350 mm) are used in Comparative Example 1, just like Examples 1 and 2. The results are shown in Table 3 below.

TABLE 3

|  | Tensile Strength (MPa) | Hardness (HV) | Structure |
|---|---|---|---|
| Example 1 | 722 | 238 | Bainite |
| Example 2 | 628 | 211 | Bainite |
| Comparative Example 1 | 520 | 150 | Austenite |

As it turned out, Examples 1 and 2 exhibit higher values with regard to both tensile strength and hardness compared to Comparative Example 1. Also, when the structure observations were conducted, Examples 1 and 2 precipitated a bainitic structure while Comparative Example 1 exhibits an austenite structure, showing no precipitation of a bainitic structure. Thus, higher strength and higher hardness of Examples 1 and 2 were confirmed in comparison with the conventional materials.

Further, as an example, the fuel rail made of a material of Examples 1 and 2 mentioned above can be formed into a product having the sizes shown in Table 4. Note that, D and t in Table 4 means outside diameters and thicknesses of the fuel rail, respectively. And a in Table 4 is mainly used under fuel pressure around 30 MPa, and when formed from the materials of Examples 1 and 2, its outer diameter D is 11 mm, the wall thickness t is 2.0 mm and it can be formed to be thin with t/D of 0.2 or less. On the other hand, in the case of a conventional product formed from the material of Comparative Example 1, since the outer diameter must be 15 mm and the wall thickness 4.0 mm in order to be usable under the fuel pressure around 30 MPa, t/D is higher than 0.2 and must be formed to be much thicker than that formed by the materials of Examples 1 and 2.

In addition, b in Table 4 is mainly used under the fuel pressure of around 80 MPa, and when formed from the materials of Examples 1 and 2, its outer diameter is 13 mm and its wall thickness is 2.3 mm, T/D can be formed to be as thin as 0.2 or less. In contrast, in the case of using the material of Comparative Example 1, since the outer diameter is 20 mm and the wall thickness is 5.8 mm in order to be used under the fuel pressure around 80 MPa, t/D is higher than 0.2, In this case as well, it must be formed to be much thicker than that formed by the materials of Examples 1 and 2.

TABLE 4

|   | Examples 1 and 2 | | Comparative Example 1 | |
|---|---|---|---|---|
| a | D = 11 mm, t = 2.0 mm | t/D = 0.18 | D = 15 m, t = 4.0 mm | t/D = 0.27 |
| b | D = 13 mm, t = 2.3 mm | t/D = 0.18 | D = 20 mm, t = 5.8 mm | t/D = 0.29 |

From the above results, it can be seen that a fuel rail made of a material of Examples 1 and 2 can be formed to have a thin wall and to be light-weighted compared with a conventional material, and it can be made to form a welded pipe by roll forming, gaining high strength and high pressure resistance. Thus, it is possible to obtain a product at a low price and in an easy manner that can cope with high a fuel pressure of 30 MPa~80 MPa.

The invention claimed is:

1. A method of manufacturing fuel rail for gasoline direct injection at a fuel pressure of at least 30 MPa, the method comprising:
   a step of forming a welded pipe from an iron alloy that contains chemical components of C, Si, Mn, P, S, Nb, and Mo, wherein the plate thickness t and the outer diameter D of the welded pipe have a ratio t/D of 0.2 or less, and
   a step of copper-brazing the welded pipe at a temperature of 1000° C. or more in a furnace so that a bainitic structure is precipitated.

* * * * *